United States Patent [19]
Gannon

[11] 3,779,063
[45] Dec. 18, 1973

[54] ADAPTERS INCLUDING ELECTRO-MAGNETIC ATTACHING MEANS FOR USE WITH EXTRUDERS

[76] Inventor: Mathew R. Gannon, 243 Park Ave., Revere, Mass.

[22] Filed: Feb. 2, 1972

[21] Appl. No.: 222,930

[52] U.S. Cl............... 72/253, 72/467, 279/1 A, 279/1 M
[51] Int. Cl............................................. B23b 5/22
[58] Field of Search................. 279/1 A, 1 M; 425/DIG. 33, DIG. 190; 269/8; 335/289; 72/253, 467

[56] References Cited
UNITED STATES PATENTS
3,022,994  2/1962  Eklund.............................. 335/289
3,545,044  12/1970  Rebouich............................. 425/3

Primary Examiner—Charles W. Lanham
Assistant Examiner—Robert M. Rogers
Attorney—Abbott Spear

[57] ABSTRACT

Adapters are disclosed for use with extruders and are provided with electro-magnetic means operable to quickly, easily and securely interconnect the die member and the adapter. Preferably, the adapter is also provided with additional electro-magnetic means operable to similarly connect the adapter to the head member which may itself be conventionally detachably attached to the barrel of the extruder.

9 Claims, 4 Drawing Figures

ADAPTERS INCLUDING ELECTRO-MAGNETIC ATTACHING MEANS FOR USE WITH EXTRUDERS

BACKGROUND OF THE INVENTION

In the use of extruders where production entails changes in the cross sectional size and shape of the extrusions, such changes entail interruption in production at intervals depending on the length of each run. While such interruptions are necessary, the length of time in preparing for the next run is obviously important.

The head of a typical extruder includes a head member releasably clamped to the barrel of the extruder, an adapter secured to the head member by bolts extending lengthwise through the adapter and into the head member, and a die member bolted in a similar manner to the adapter. The adapter and the die member have axial passages, that of the adapter reducing the cross sectional area of the extrusion and usually imparting to it a cross sectional shape related to the final extrusion and that of automatically receive precise positioning and once the die member effecting the final extrusion of a particular size and shape.

It is necessary, of course, that the ends of the axial passages of the adapter register with the proximate ends of the head member and the die member. Where the major changes in shapes are to be made, both the adapter and the die member must be replaced and, when only the size of the extrusion is to be changed, only the die member needs to be replaced. In either case, considerable production time is lost because the replacement part or parts must be precisely positioned and securely anchored in place.

THE PRESENT INVENTION

The general objective of the present invention is to provide an adapter for use with the head and die members of extruders enabling the adapter to be quickly and accurately secured to or released from the head member, the die member to be as easily and as accurately secured to or released from the adapter member, or both the adapter and the die member to be so secured or released.

In accordance with the invention, this objective is attained by providing that at least the end wall of the adapter against which the die member is seated and preferably also the end wall of the adapter to be seated against the head member have electro-magnetic means operable, when energized to securely interlock the mutually engaged faces. Each such electro-magnetic means is located inwardly of the appropriate one of the adapter end walls which end wall has at least two radially spaced portions magnetic material insulated from each other by non-magnetic material and, except for the gap established by the non-magnetic insulation material, defining a flux path. To complete the flux path, when an electro-magnetic means is energized, it is necessary that the end face of the member to be connected thereto be of magnetic material and overlap said two radially spaced portions. See United States Pat. No. 2,561,769. When a flux path is thus completed, the proximate end wall of the member in engagement with the appropriate end wall of the adapter is securely locked thereto until the circuit to the associated electro-magnetic means is opened. By such means, either or both end walls of the adapter may be quickly and easily secured to the proximate end wall of the appropriate member or members and be as quickly and easily detached as replaced.

A particular objective of the invention, when electro-magnetic means are provided for both end walls of the adapter, is to employ a separate circuit for each of them and, additionally, to provide each such circuit with a rheostat.

Yet another objective of the invention is to provide for the mechanical attachment of the adapter to the barrel in a manner that enables the adapter to be quickly connected thereto and held thereon should the power fail or its circuit be accidentally opened.

THE PREFERRED EMBODIMENT OF THE INVENTION

In the accompanying drawings, a preferred embodiment of the invention is shown of which:

Figures 1, 2:
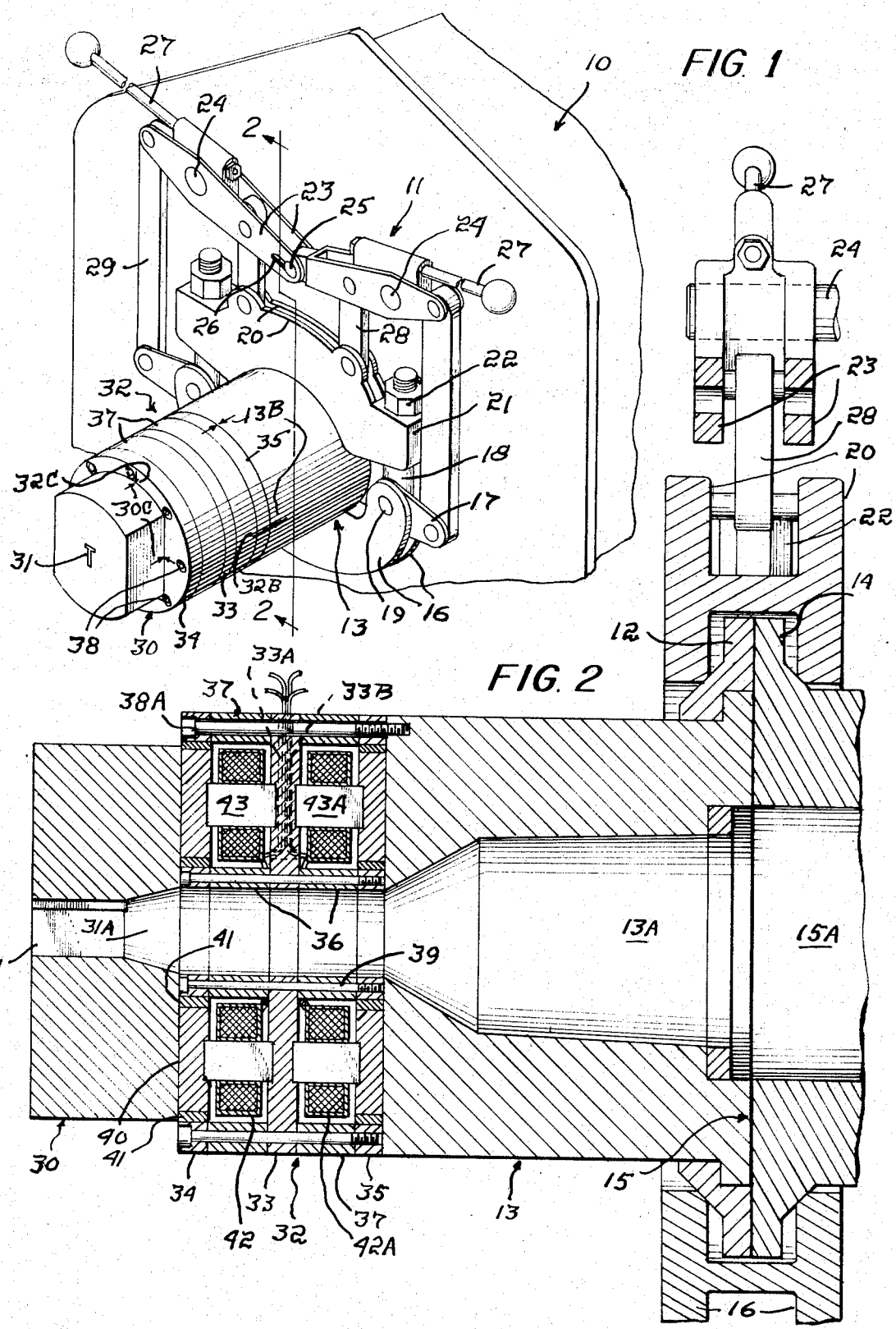
FIG. 1 is a perspective view of an extruder head including an electro-magnetic adapter.
FIG. 2 is a longitudinal section of the adapter with the electromagnets shown somewhat schematically and connecting the adapter to the head member and the die member to the adapter.
Figure 3:
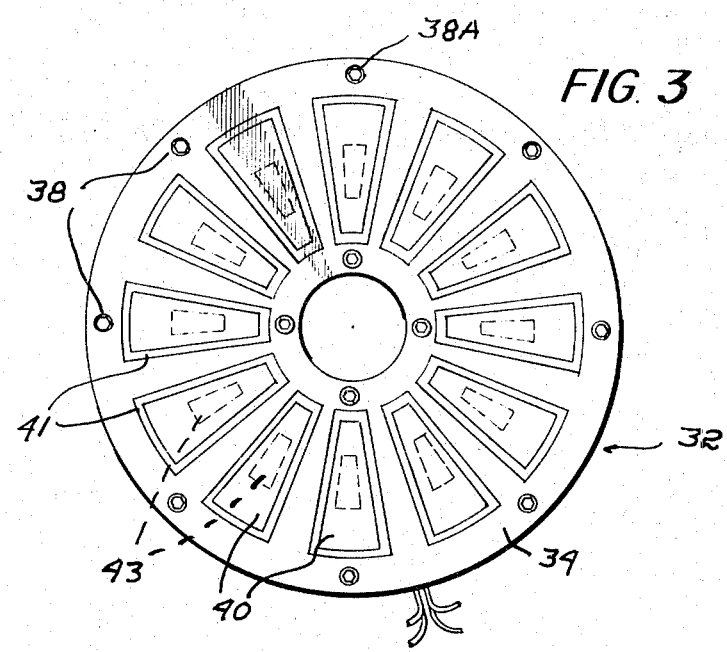
FIG. 3 is a view of one end of the adapter.
Figure 4:
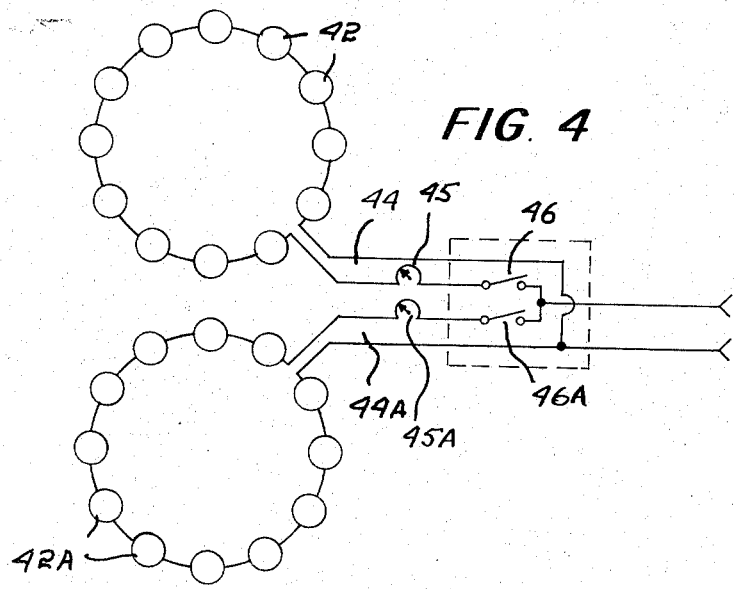
FIG. 4 is a schematic view of the electro-magnets and their circuits.

A conventional extruder, generally indicated at 10, has means, generally indicated at 11, to clamp the outwardly and rearwardly tapered flange 12 of the head member 13 against the outwardly and forwardly tapered flange 14 at the proximate end of the extruder barrel 15 with the proximate ends of their bores 13A and 15A, respectively, of the same size and in registry. The bore 13A is shown as tapering by steps towards its outlet end.

The clamping means 11 includes a lower pair of flange straddling and gripping jaws 16 interconnected at each end through an arm 17 and a vertical bolt 18 by a pivot 19. An upper pair of flange straddling and gripping jaws 20 is connected at their outer ends by guides 21 slidably receiving the bolts 18 but held captive thereon as by nuts 22.

Each of a pair of arms 23 is connected to the extruder 10 by a pivot 24. The proximate ends of the pairs of arms 23 are interconnected by a pivot 25 and the ends of one of said pairs have pivot-receiving slots 26 permitting the arms 23 to be swung upwardly or downwardly to a limited extent by means of the handles 27, one for each pair of arms 23 and mounted thereon.

Each pair of arms 23 has links 28 and 29 pivotally connected thereto on opposite sides of its supporting pivot 24, both links 28 pivotally connected to the upper pair of jaws 20 and each link 29 pivotally connected to an appropriate one of the arms 17.

The clamping means 11 are thus operable to draw the clamping jaws 16 and 20 into and out of clamping relationship with the head flange 12 and the barrel flange 14 and in said clamping relation, the head member 13 is secured against the end of the barrel 15.

A die 30 has an axial passage whose distal portion 31 is of the cross sectional size and shape wanted for the extrusion. As it is necessary to reduce the cross sectional area of the extruded mass from that established by the outlet end of the head passage 13A, an adapter, generally indicated at 32, is positioned between the head member 13 and the die 30. The adapter 32 has an axial passage 32A, which may also but does not necessarily, taper forwardly and inwardly but which typically imparts to the plastic being extruded a shape related to that to be established by the die member 30. As shown, the rear portion 31A of the axial passage of the die member 30 is rearwardly and outwardly tapered to merge with the proximate end of the adapter passage. It is thus possible to provide extrusions of different sizes but of the same shape by substituting one die member for another with the substituted die having a passage of a different cross-sectional area and its rear portion having a shorter or longer tapered portion to vary, as required, the reduction in cross-sectional area of the material passing through the adapter 32.

In accordance with the invention, the adapter 32 has a central wall 33 and end walls 34 and 35 with inner and outer spacers 36 and 37 separating the end walls from the intermediate wall. The end walls are interconnected through the outer spaces 37 and the intermediate wall 33 by a series of bolts 38 and through the inner spacer 36 and the intermediate wall by a series of bolts 39. Each end wall has a circular series of sections of magnetic material 40 separated from each other and from its inner and outer edge by non-magnetic boundary material 41, but in the plane thereof. It will be understood that at least the end walls of the die and head members that are to be in contact with the end walls of the adapter are of magnetic material.

A series of coils 42 each having a core member are housed within the adapter between each end wall and the intermediate wall 33 with each core supported by a section 40 and said intermediate wall. The coils and cores inwardly of the adapter end wall 34 are indicated at 42 and 43, respectively, and those inwardly of the adapter end wall 35 being indicated at 42A and 43A, respectively. The coils 42 are in a circuit 44 provided with a rheostat 45 and a switch 46 while the coils 42 are in a like circuit 44A also provided with a rheostat 45A and a switch 46A. The intermediate wall 33 has channels 33A and 33B for the circuits 44 and 44A, respectively. It will be apparent that when the coils are energized, no effective flux path exists until the boundary material 41 is bridged as it is when the end of the appropriate one of the members 13, 31 is in face-to-face contact therewith.

The coils 42 and 42A have opposite effect when their circuits are closed so that when the coils 42A are energized with the adapter 32 seated against the head member 13, the adapter member is secured thereto. Similarly, when the die member 30 is seated against the end wall 34 with the circuit 44 closed, the die member 30 is securely attached to the adapter 32.

It is preferred that at least one bolt, the bolt 38A, passes completely through the adapter and into the head member 13 in order to ensure that, should the power fail or be "turned off," the adapter could not drop. The bolt 38A is also useful in attaching the adapter 32. The bolt 38A may be a loose fit in its passage to enable movement of the adapter 32 when supported thereby.

In order to ensure that the adapter and the die member may be precisely positioned with their axial passage in registry with each other and with the axial passage of the head member 13, the adapter 32 and the head member 13 have markers 32B and 13B, respectively, corresponding ones of which are in alignment when their axial passages are in registry and the adapter 32 and the die member 30 also have markers 32C and 30C, respectively, which are in alignment when their axial passages register. In this connection, it will be noted that the provision of rheostats in the circuits enable the adapter to be connected to the head member and the die member connected to the adapter but manually movable to ensure correct positioning before being securely anchored.

I claim:

1. An adapter for securing a die member to the head member of an extruder, both members of magnetic material, said adapter including end faces, each provided with portions of magnetic material that are radially extending and spaced and insulated from each other, said adapter having a passage between its end faces dimensioned to effect communication between the two members when interposed with one end face of the adapter seated in a predetermined position against the head member and the die member seated in a predetermined position against the other end face of the adapter, the magnetic portions of each face being dimensioned and spaced to be overlapped by the member with which it is in face-to-face contact, and said adapter including electromagnetic means for each end face arranged and disposed so that when both means are then energized, the flux paths are completed through the appropriate portions and the adapter is magnetically secured to the head member and the die member is magnetically held to the adapter.

2. The adapter of claim 1 in which each of the electromagnetic means includes a circuit, each circuit including a switch and a rheostat.

3. In combination, a first member having a face to be secured to the vertical face of a second member, at least one member being of magnetic material, the face of the other member with which the face of said one member is to engage provided with portions of magnetic material that are radially extending and spaced and insulated from each other, said members having passages between their end faces to be placed in communication with each other when said faces are in mutual contact and in predetermined relative position, said magnetic portions being dimensioned and spaced to be overlapped by the face of magnetic material when seated thereagainst, and the member that does not have the magnetic portions including electromagnetic means arranged and disposed so that when said faces are in mutual contact and said means are energized flux paths are completed through said portions whereby the members are magnetically held together, and a circuit including said electromagnetic means and provided with a switch and a rheostat.

4. The adapter of claim 1 in which there are an end wall, an intermediate wall, and spacing means between said walls, and said electromagnetic means includes a series of coils between each end wall and the intermediate wall and encircling said passage.

5. The adapter of claim 4, and a circuit for each of the electromagnetic means, and the intermediate wall has channels, each receiving portions of the appropriate circuit.

6. The adapter of claim 1 and bolt means detachably connecting the adapter to the head member, the bolt means when not set up providing for limited lateral movement of the adapter relative to the head member.

7. The adapter of claim 1 in which there are a pair of end walls, an intermediate wall, and spacing means between each end wall and said intermediate wall providing axially spaced annular chambers and each of said electromagnetic means includes a series of coils encircling said passage and connected to at least one of the walls defining its chamber.

8. The adapter of claim 1 in which the adapter and the head member each include two marks arranged and disposed with corresponding markers in alignment when the adapter and head member are positioned for use.

9. The adapter of claim 1 in which the adapter and die member each include two markers arranged and disposed with corresponding markers in alignment when the adapter and die member are positioned for use.

* * * * *